UNITED STATES PATENT OFFICE.

MARTIN S. WOELFEL, OF SOUTH BEND, INDIANA, ASSIGNOR TO CHRISTOPHER T. FLUEGEL.

COMPOSITION OF MATTER AND METHOD OF TEMPERING SAME.

No. 916,244.  Specification of Letters Patent.  Patented March 23, 1909.

Application filed June 29, 1907. Serial No. 381,546.

*To all whom it may concern:*

Be it known that I, MARTIN S. WOELFEL, a citizen of the United States, residing at South Bend, in the county of St. Joseph and State of Indiana, have invented a certain new and useful Composition of Matter and Method of Tempering Same, of which the following is a specification.

My composition consists of the following ingredients, combined in approximately the proportions stated, viz:—

| | |
|---|---|
| Sawdust | 100 pounds. |
| Water | 12 pounds. |
| Glycerin | 1 pound. |
| Oil of vitriol | 2 pounds. |

The oil of vitriol (sulfuric acid) and the water are first mixed and then the sawdust added and thoroughly commingled, and then the glycerin is added. These ingredients thus prepared are to be thoroughly mingled by agitation and grinding until the mass is of a consistency of the nature of soft modeling clay. The composition may then be molded into various articles of manufacture, or ornamentations for buildings, advertising signs having raised letters, and many other articles for which my composition is especially adapted.

The molded articles are then allowed to dry until they are sufficiently "set" to prevent distortion when handled, the articles when thus dried being of about the consistency of cork and of a slightly yielding or pliable nature. If it is desired to still further harden the molded articles, they are subjected to a bath of an alkali solution which extracts a certain percentage of the water, glycerin, and oil of vitriol, and if a greater degree of hardness is desired the articles are subjected to the bath for a longer period of time, the hardness being thus readily measured or controlled, as will be obvious.

The treatment of the alkali solution renders the articles brittle and care should be taken not to unduly prolong the bath.

In the use of my composition any vegetable fiber can be used, but sawdust is preferable because of its cheapness, and of its nature, the fibers thereof being easily separable. The saw-dust employed will preferably be non-resinous. The materials are employed at their normal temperature, and air may be employed to accomplish the requisite drying, or the heat of the sun may be employed for this purpose.

I claim—

1. The method of producing a non-elastic body, which consists in first mixing water and oil of vitriol, then adding and thoroughly mixing a vegetable fiber to said ingredients, then adding glycerin, then molding and drying the mixture, and subsequently subjecting the mixture to a bath to extract a certain percentage of the oil of vitriol from the product.

2. The method of preparing the herein described composition, which consists in first mixing water and oil of vitriol, then mixing and thoroughly agitating a vegetable fiber with the aforesaid ingredients, then adding glycerin, then molding and drying the mixture, and subsequently subjecting the mixture to a bath to extract a certain percentage of one of the aforesaid ingredients.

In testimony whereof I have signed my name to this specification in the presence of two subscribing witnesses.

MARTIN S. WOELFEL.

Witnesses:
GEORGE OLTSCH,
G. M. COLE.